United States Patent

Dauder Guardiola

[11] Patent Number: 5,317,110
[45] Date of Patent: May 31, 1994

[54] AUTOMATIC WEIGHING MACHINES FOR FOOD PRODUCTS

[75] Inventor: Agustin Dauder Guardiola, Badalona, Spain

[73] Assignee: Talleres Daumar S.A., Barcelona, Spain

[21] Appl. No.: 950,893

[22] Filed: Sep. 25, 1992

[30] Foreign Application Priority Data

Sep. 27, 1991 [ES] Spain ................................. 9102129

[51] Int. Cl.⁵ ...................... G01G 13/16; G01G 19/00
[52] U.S. Cl. ................................... 177/25.18; 177/145
[58] Field of Search ............................ 177/25.18, 145

[56] References Cited

U.S. PATENT DOCUMENTS

| | | | |
|---|---|---|---|
| 4,308,928 | 1/1982 | Oshima | 177/25.18 |
| 4,405,023 | 9/1983 | Guardiola | 177/59 |
| 4,444,282 | 4/1984 | Kawanishi | 177/25.18 |
| 4,819,749 | 4/1989 | Guardiola | 177/25.18 |

FOREIGN PATENT DOCUMENTS 0045319 2/1982 European Pat. Off. .
0063056 10/1982 European Pat. Off. .
0280283 8/1988 European Pat. Off. .

Primary Examiner—George H. Miller, Jr.
Attorney, Agent, or Firm—Birch, Stewart, Kolasch & Birch

[57] ABSTRACT

Improvements in automatic weighing machines for food products that exhibit several buckets (6), arranged in a circle and in an overhanging manner, joined radially to a revolving central support (7) in relation to a vertical axis; each bucket is joined to the support by two horizontal, parallel and superimposed elastic bands (12), that allow for its vertical swinging; and these buckets pass successively over a station (13) with a single device for weighing (14) connected with the programming processing unit, and they have at least one of their walls (15) that is movable for the selective unloading of each batch of units of the product contained in the corresponding buckets selected according to the total weight desired, and this unloading is effected onto device (32)-(33) for conveying these batches toward the exit of the machine.

1 Claim, 5 Drawing Sheets

AUTOMATIC WEIGHING MACHINES FOR FOOD PRODUCTS

BACKGROUND OF THE INVENTION

1. Field of the Invention

The present patent relates to certain improvements in automatic weighing machines for food products which contribute various advantages to the function they are intended for and these advantages will be noted further on, besides others inherent to their organization and make-up.

2. Description of Related Art

Machines weighing food products are already known in which there is a relatively high number of containers, for example 10 to 14, which are fed with the products to be weighed from a single common entrance and which are unloaded onto other analogous containers on which the weighing is done; the machine may lack these latter containers, in which case the first ones are directly weighers. These known weighing machines include an electronic computer unit that performs the calculation of the possible weight combinations of the products stored in these containers and selects those containers whose sum of weight, in other words its total weight, is most approximate to the weight desired, and orders it to be unloaded on an exit transporter that is exhibited by these machines. This strategy corresponds to what is called "associative weighing," in which the product goes through various weighing points and an electronic calculator looks for a combination whose real value most closely approximates the desired nominal weight.

The applicant company itself is the owner of U.S. Pat. No. 8,700,794, which protects an automatic weighing machine for food products of the type (which in turn corresponds to U.S. Pat. No. 500,951 also granted to the applicant company) that comprises a structure or frame supporting the members of the machine, means for activating these members, means for feeding in the appropriate product, some means to weigh it, some bins to store it temporarily and equipped with means for unloading it onto means to convey it to the exit of the machine and a programming processing unit, which continually records the real weight of the product entering the machine as it is being weighed, as well as the real weight of the product which at each moment is contained by all and each one of the temporary storage bins, and when the weight of the product contained in a corresponding bin reaches a value preset by the user of the machine, the programming processing unit orders the unloading of all the units of product with this preset final weight; there are appropriate connection means between the above mentioned programming processing unit and the corresponding members of the machine, as well as conventional means of control, monitoring, safety, etc. of the machine.

The automatic weighing machine that is the object of the above mentioned U.S. Pat. No. 8,700,794 is characterized in that the means for feeding the product into the entrance of the machine, controlled by the programming processing unit, preferably comprise a hopper, a conduit and at least one endless belt, whose end empties out above a series of buckets that are opened on the top to receive the product which is unloaded from this end; these buckets are arranged in a circle and joined respectively in an overhanging manner to individual means for weighing that are aligned radially and closer to the center than the buckets themselves; these means for weighing are then connected with the programming processing unit and mounted on a horizontal revolving platform by suitable means in relation to a central vertical axis; in that the above mentioned buckets exhibit at least one of its walls that is movable, that is activated by suitable means and controlled by the programming processing unit; and in that it exhibits, below these buckets, a series of fixed bins that are open on the top to receive the corresponding product already weighed and with at least one of its walls that is movable, also activated by suitable means and controlled by the programming processing unit, to allow for the unloading of each batch of units of product with the preset final weight (with the batch being gathered in a suitable fixed bin); the unloading is performed on the means for conveying the above mentioned batches of product toward the exit of the machine.

The strategy followed by both the machine that is the object of U.S. Pat. No. 8,700,794 and that of U.S. Pat. No. 500,951 in their functioning corresponds to what is called "accumulative weighing," in which the programming processing units permanently take account of the real weights of the units of product that it is continually storing temporarily in all the bins that are exhibited by these machines for this purpose and continually combines them mathematically with the real weights of the units of product as they are being weighed. In this way, a greater production is obtained per unit of time of batches of units of products having a preset final weight (and also with a preset tolerance) and also a lesser number of rejected units is obtained in comparison with weighing machines known before the oldest U.S. Pat. No. 500,951.

The machine that is the object of U.S. Pat. No. 8,700,794 is adaptable to a very wide range of products (peppers, onions, potatoes, garlic, citrus products, Brussels sprouts, apples, nuts, green beans, and in general food products of varying sizes); and it has a high rate of production with minimum rejection, without the danger of possible damage to the product initially rejected, since this product remains in its corresponding bucket, and it also allows for greater regularity in the weight of the batches obtained, with a self-regulation of the feeding, in accord with the desired final weight of the batch of units of product to be obtained.

SUMMARY OF THE INVENTION

However, the applicant, thanks to his experience in the operation of the automatic weighing machines protected in the above cited U.S. Pat. No. 500,951 and 8,700,794, has devised certain improvements in automatic weighing machines for food products of the type described above and corresponding to U.S. Pat. No. 8,700,794, by now using the strategy called "associative weighing" instead of the "accumulative weighing" strategy specific to the two earlier U.S. Pat. Nos. 500,951 and 8,700,794, since in certain practical applications of this kind of automatic weighing machines in which the size itself, and/or the relatively large variation of the products to be treated allow for less exactness as to the functionality and structure of the weighing machine.

The above mentioned improvements that are the object of the present invention apply to automatic weighing machines for food products of the type that comprises a support frame for the members of the machine, means for activating these members, means for feeding the appropriate product into the entrance of the machine that are controlled by a programming processing unit; these means normally include a hopper with a conduit and at least one endless belt, whose end empties out into an area under which receiving buckets are moving in a line and are open on the top to receive the product that is being unloaded from the end of the above mentioned endless belt, means for weighing the product contained in each bucket and its tare, and these buckets exhibit means for their unloading onto means for conveying the product toward the exit of the machine, and a programming processing unit which continually records the tare of each bucket and the real weight of the product that is being collected by each of the buckets as it is being weighed, and when the total weight of the product contained in corresponding buckets reaches a preset value with a tolerance preset by the user of the machine, the programming processing unit orders the unloading of those buckets whose batch of units of products equals this preset total weight; there are appropriate means of connection between the above mentioned programming processing unit and the corresponding members of the machine, as well as conventional means for the control, monitoring, safety etc. of the machine.

The present improvements in automatic weighing machines for food products are characterized in that the buckets, arranged in a circle and in an overhanging manner, are joined radially by suitable means to a revolving central support in relation to a central vertical axis; in that each bucket is joined to the central support by two horizontal elastic bands that are parallel and superimposed and that make possible the vertical swinging of the bucket, in that the buckets successively pass over a station with a single means for weighing, connected with the programming processing unit and in that the above mentioned buckets exhibit at least one of their walls that is movable which is activated by suitable means that are controlled by the programming processing unit for the selective unloading of each batch of units of the product contained in the corresponding buckets selected according to the desired total weight; the unloading is performed onto means for conveying each one of the above mentioned batches of product toward the exit of the machine.

The improvements in automatic weighing machines for food products which are the object of this patent afford, among others and in comparison with known weighing machines, the advantages of requiring a single loading cell for all the buckets, thus maintaining a single feeding and eliminating the temporary storage bins for the products already weighed, and the weighing machine is simpler and has a lower cost, without any decrease in its solidity which is relatively high.

The improvements according to the present patent offer the advantages that have been described above, in addition to others that can easily be deduced from the embodiment of an automatic weighing machine for food products that is equipped with these improvements and that is described in greater detail below to facilitate comprehension of the characteristics explained earlier, while at the same time several drawings reveal various details and accompany this document for this purpose; these drawings, only as an example and without limiting the scope of the present invention, represent a practical case of the object of the patent.

BRIEF DESCRIPTION OF THE DRAWINGS

In the drawings.

FIG. 5 is a lateral and partial view of the bucket according to FIG. 4.

DESCRIPTION OF AN EMBODIMENT OF THE INVENTION

Figure 1:
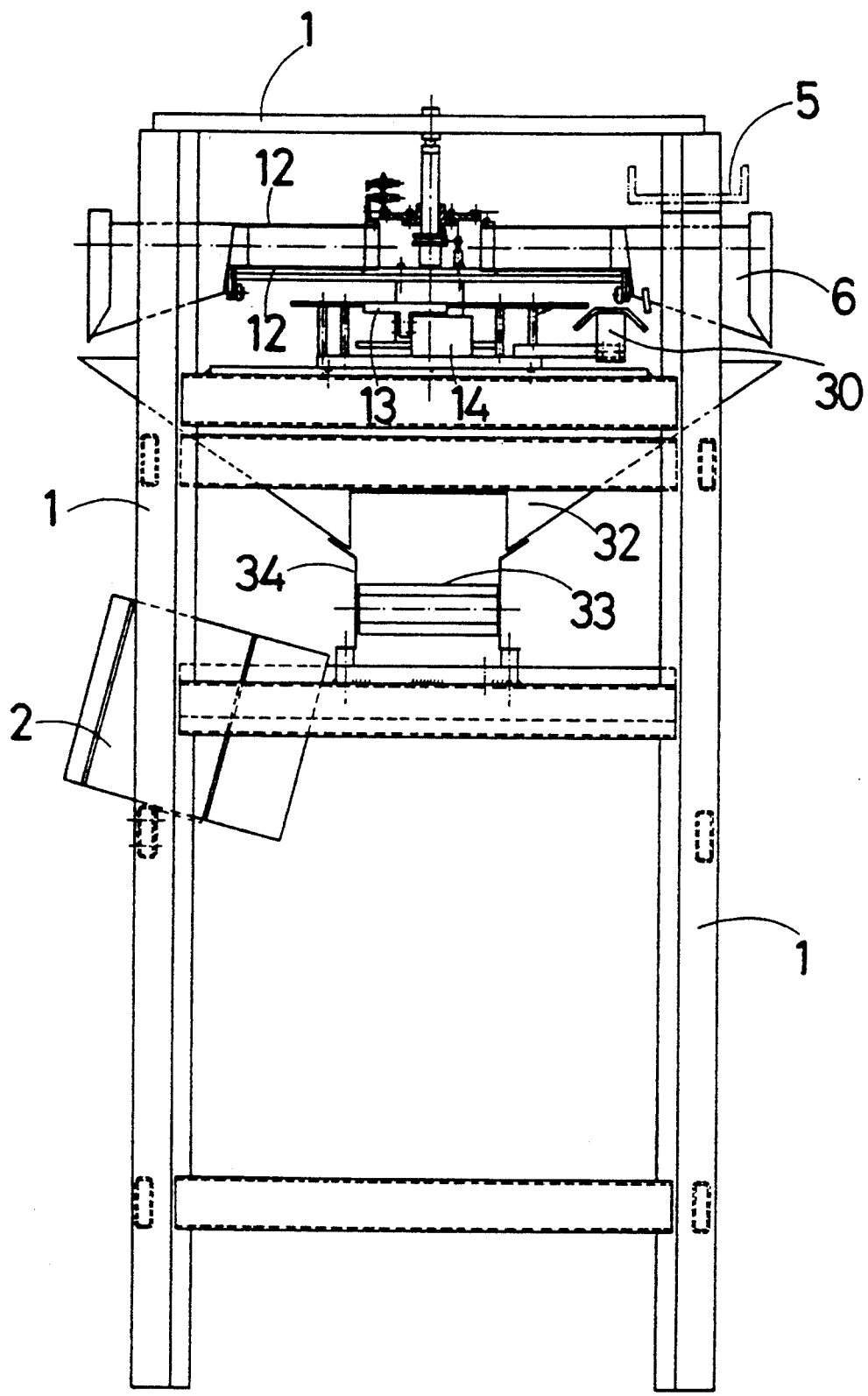
FIG. 1 represents a weighing machine equipped with the above mentioned improvements and according to an embodiment thereof, according to an elevation view in which the means for conveying the batches of product toward the exit of the machine are arranged facing the observer and this machine exhibits sectioned parts to provide greater information.

According to what is represented in the drawings, the automatic weighing machine for food products, equipped with the improvements according to the invention and in accordance with an embodiment of the invention, comprises structure or frame 1 for the support and anchoring of the various members of the machine, and this frame allows for the support, and is adjustable in height if need be, of the machine on the floor on which it is mounted and, if need be, it allows for it to be attached to the floor; the frame corresponding to the upper part of the machine should be also understood as the frame, especially in reference to the upper structure of the machine which exhibits, among other elements, means of support and guidance for the means for weighing and for the means for transporting the batches of product already obtained toward the exit of the machine.

The means for feeding or introducing the corresponding product into the machine are regulated by the programming processing unit, which in this example is located inside housing 2 in which other electric monitoring and control elements may be located. The above mentioned means of feeding include, in the case of the example and preferably, hopper 3 (FIG. 2) with a conduit equipped with a conveyor, normally an elevator of the product and comprised of endless belt 4 (their means of activation are not represented), which conveys the product until unloading it, through its mouth or free end 5 (FIGS. 1 and 2), in an area under which the receiving buckets, such as bucket 6 (see FIG. 2) are moving in a line. The above mentioned means for feeding the product into the entrance of the machine may be mounted so that their inclination can be varied through suitable devices and these means may also be comprised of other conventional members or elements, according to the needs and actual arrangement of the given facility in which the weighing machine in question is installed. Thus, the means for feeding the product may be activated by an electric motor, through a reducer as the case may be, and obviously any other type of motor or suitable means of activation could be used.

Figure 2:
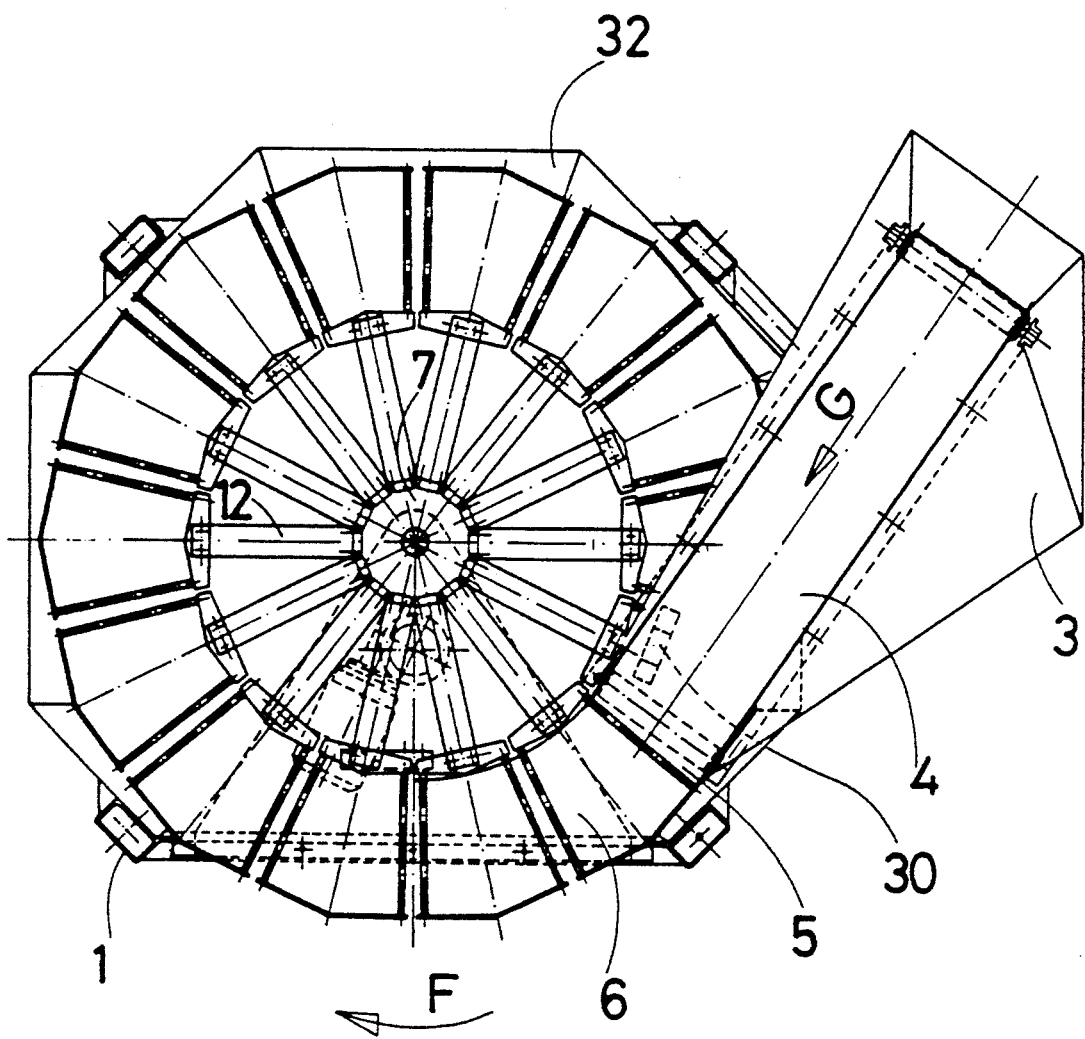
FIG. 2 corresponds to a ground plan view of the machine according to FIG. 1.
Figure 3:
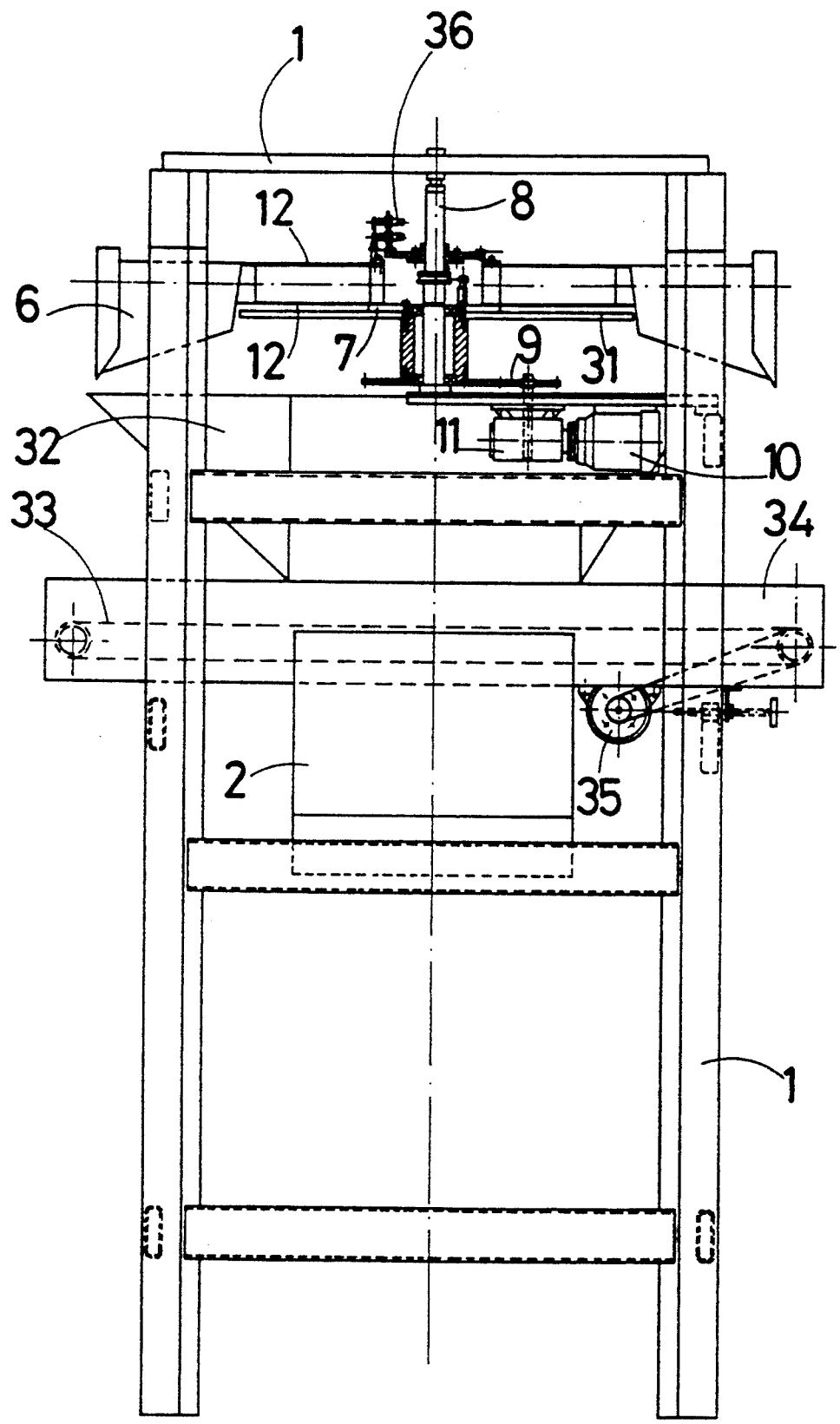
FIG. 3 shows the machine at a 90° turn to the right, in which position the means for conveying the batches of product toward the exit of the machine are oriented from left to right in relation to the observer and in this view some parts have also been sectioned to provide greater information.

Buckets 6 are open on the top to receive the product which is continually being unloaded from mouth 5 of the endless conveyor belt and in this example there are fourteen buckets, although their number will obviously vary according to the needs; these buckets are arranged in a circle and in an overhanging manner (FIGS. 2, 1 and 3) and are joined radially to central revolving support 7 in relation to a central vertical axis of the machine. This support 7 is mounted and guided around pivot 8, fastened firmly to frame 1, with the possible use of suitable rolling means. Central support 7 exhibits its horizontal upper part and this support is activated through transmission means 9 (which in the case represented in FIG. 3 are made up of a pair of gears, although these transmission means could be any other conventional means), by electric motor 10 which, in this example, is equipped with reducer 11, but any other type of conventional motor can also be used and the reducer can also be eliminated. In FIG. 3 the mounting of the above mentioned electric motor can be seen, along with its reducer and means of transmission, as well as the structural part of frame 1, and of the guidance and support means which allow for the gentle rotation of central revolving support 7 with its respective buckets 6.

Buckets 6 are open at their top to be able to receive the product being delivered by the feeding means and which are being continually unloaded from its mouth 5, for this purpose the series of buckets 6, arranged in a circle in the manner described, are shifted by the rotation of support 7 moving in a line under mouth 5. Each bucket 6 is joined to central support 7 by two elastic bands 12, visibly horizontal, parallel and superimposed, which allow for the essentially vertical swinging of the respective bucket. In FIGS. 1, 2 and 3 these bands 12 and their arrangement can be seen, so that each pair of bands corresponding to each bucket is fastened to that bucket by one of its ends, while by the opposite end it is fastened to support 7, with the interposition of a corresponding vertical separator to maintain the parallel position of the two bands of each pair.

Buckets 6 move successively and continuously, during their circular motion, on station 13 (FIG. 1) which exhibits a single means of weighing 14 which may be a transducer or any other type of suitable loading cell, this means of weighing is connected with the programming processing unit and it determines the weight of the bucket with the corresponding product that it contains, as well as the tare of the bucket when it is empty and moves onto this weighing station 13. It should be emphasized that the means or activating group revolving around central support 7 can be mounted underneath this weighing station, since logically there is not any unloading of the product contained in the bucket at this station.

Figure 4:
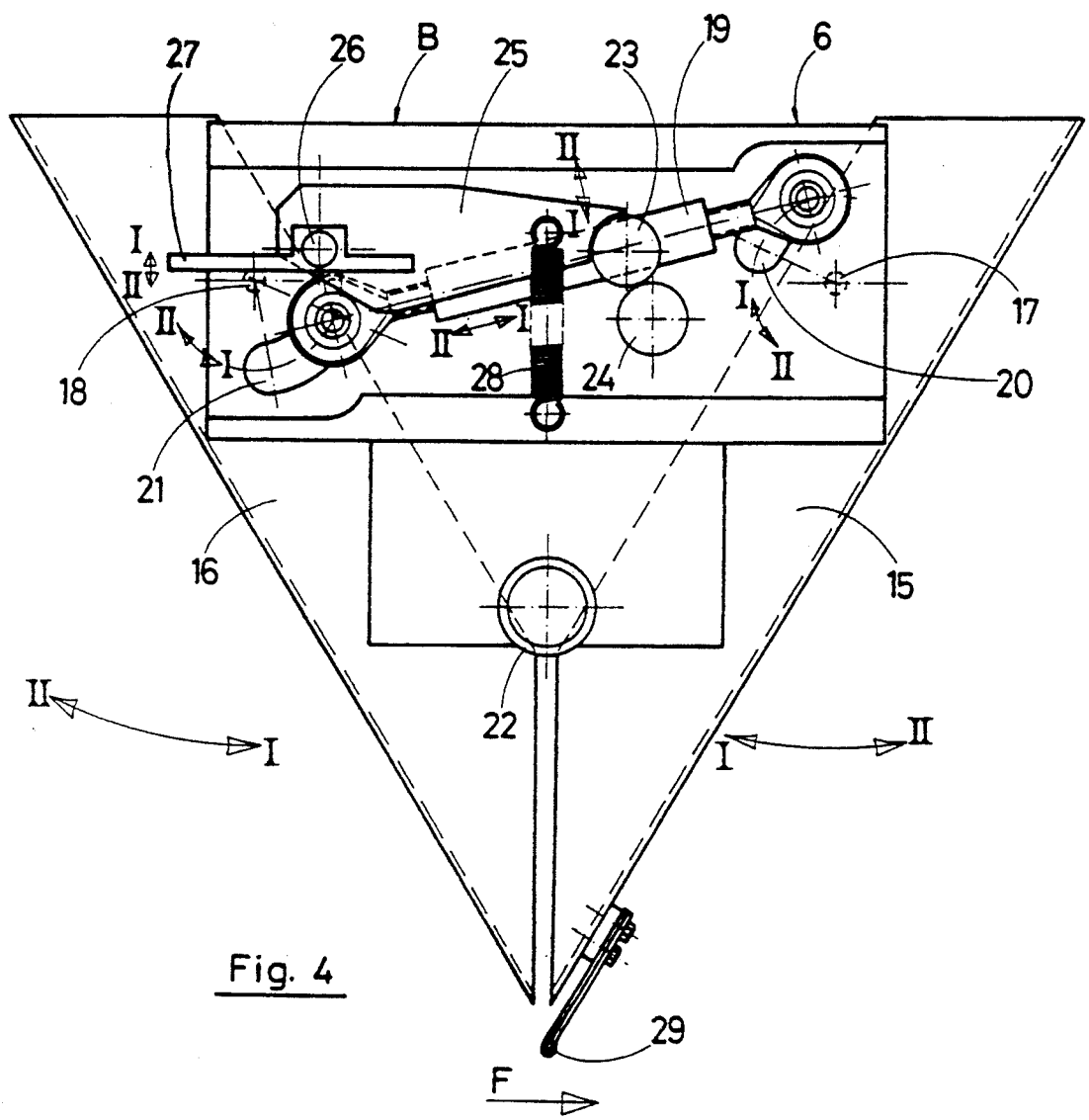
FIGS. 4 and 5 correspond to a detailed view, in greater size, of the buckets of the weighing machine, with FIG. 4 being an elevation view from the inside of the bucket and closer to the axis of rotation of the corresponding central support.
Figure 5:
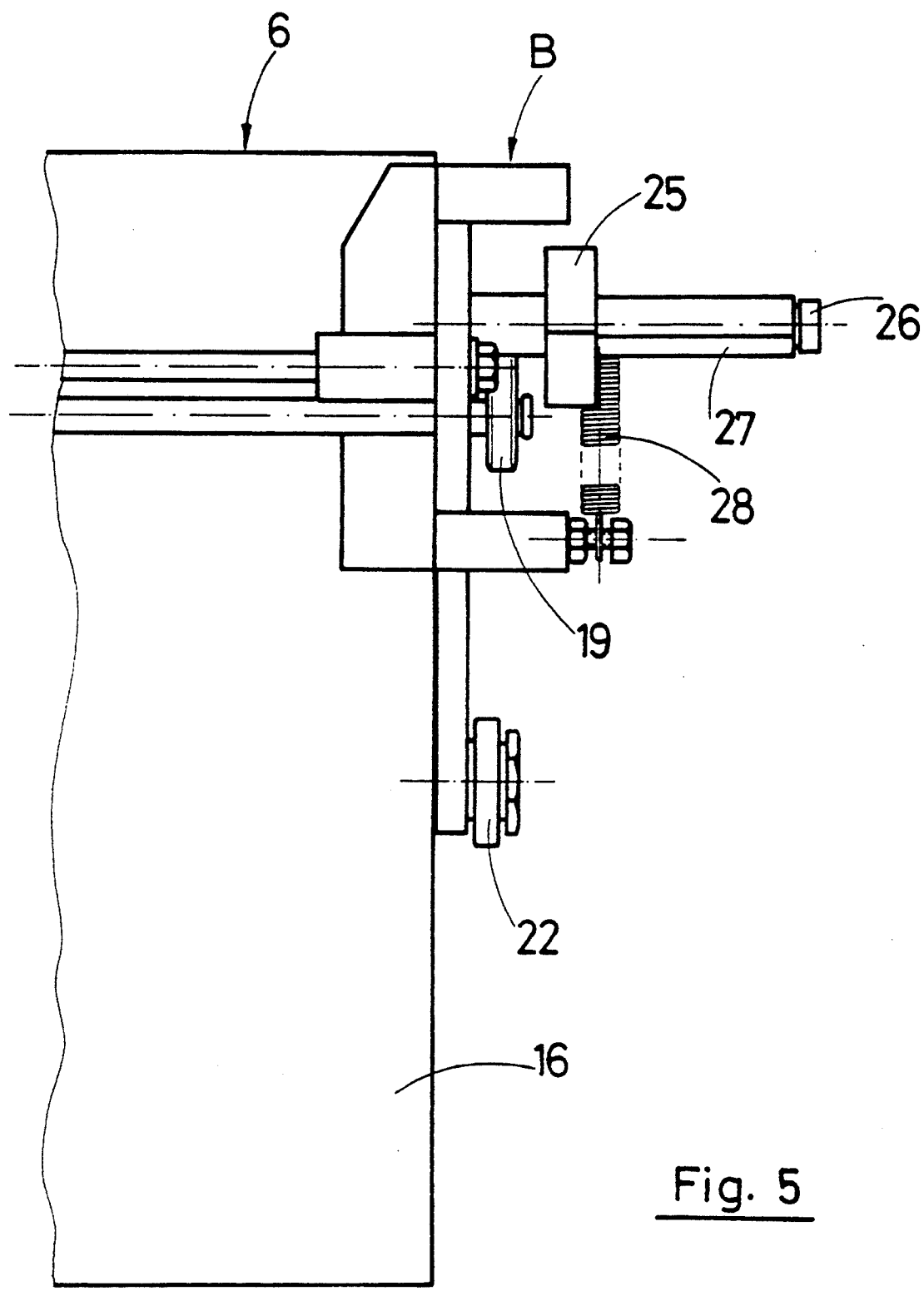

Each bucket 6 exhibits at least one of its walls that is movable, activated so that it can be opened by suitable means regulated by the programming processing unit; and as an embodiment a bucket with two movable walls is represented in FIGS. 4 and 5, and the walls tilt outward to unload the corresponding product and revolve, moving close to one another, in order to be able contain the product inside the bucket. In this example of a possible type of bucket to be used in the weighing machine that is being described, the bucket (FIGS. 4 and 5) exhibits two movable walls 15 and 16 which are joined according to tilting axes 17 and 18 to chassis B. Both movable walls are connected to each other by connecting rod 19, in this case adjustable as to its length; this rod is joined by each of its two ends with movable walls 15 and 16 respectively, and for this purpose chassis B exhibits individual openings 20 and 21 suitably lengthened and curved, through which the pivots exhibited by each of these walls pass and they are fastened in an articulated and swinging manner to the respective ends of the connecting rod.

The two walls 15 and 16 are located facing one another in the closed position of the bucket (represented in FIG. 4), a position in which the bucket can receive and contain the product which is being unloaded onto it and then go on to weigh it, by the support of its idle wheel 22 on station 13 equipped with the corresponding means of weighing 14. Connecting rod 19 exhibits a disk or else a wheel 23 which is supported on another disk or else on wheel 24, which is in turn joined to chassis B. Against disk or wheel 23 lever 25 is applied which is joined to pivot 26 in turn connected to chassis B, whose lever exhibits blade 27 which is bisected by pivot 26 itself and whose lever 25 is maintained in the position shown in FIG. 4 due to an elastic means such as spring 28, joined on the top to the above mentioned lever and on the bottom to chassis B and the two walls 15 and 16 are maintained in the closed position of the bucket by the stop and retention action of connecting rod 19 that is exerted by lever 25 on wheel 23 which is supported against wheel 24.

In FIG. 4 the bucket is represented in a front view by its inside in relation to the weighing machine and in the operating position, i.e., with its two walls together (position I marked with different arrows corresponding to the walls, connecting rod and its ends and the fin), so that once the bucket has been weighed along with the corresponding product and assuming that the product contained in the bucket has been selected by the programming processing unit to obtain the desired total weight in a batch of units of product contained in the corresponding buckets selected for this purpose (among them the bucket that is being described), the programming processing unit determines the opening of the walls of the bucket and thereby the unloading of the product contained in the bucket—together with the remaining buckets selected according to what has been indicated—, activating the corresponding electromagnet (not represented in the drawings) which causes the rotation of blade 27, whose left end (according to FIG. 4) shifts downward—position II—, so that the right end of lever 25 is raised—moving to position II—by overcoming the counteracting action of spring 28, thus disk or wheel 23 is freed from the stopping action of the above mentioned end of lever 25 and thus the two movable walls 15 and 16 are shifted outward—position II-—respectively, both by the action of their own weight and by the complement of weight corresponding to the product contained in the bucket, and the connecting rod shifts to position II and its right and left ends also shift to position II.

When the action of the electromagnet of the respective buckets selected by and according to the programming processing unit ceases, the group made up of lever 25 and blade 27 revolve in a direction opposite to the previous one—position I—by the action of spring 28, and in each of the open buckets, while they circulate by the revolving of central support 7, their walls are closed when they hit their corresponding tongue 29 (fastened to wall 15 which in this case is the front wall in the direction of the circling of the series of buckets, i.e., assuming that central support 7 with its buckets 6 revolve in the clockwise direction indicated with the arrow F (FIGS. 2 and 4), with stop 30 (FIG. 1), for which this stop exhibits an entrance ramp or part inclined downward or access for tongue 29, an upper horizontal part and a downward exit ramp, with tongue 29 being made preferably of a relatively flexible material to absorb the secondary effects that might derive from the collision mentioned. At this moment wall 15 (which was in open position II) shifts to position I and its tilt in this closing direction causes the shifting of the connecting rod toward position I and of its ends or heads also toward position I, while the other wall 16 tilts simultaneously and in a synchronized manner toward the closing position; all this in such a way that disk or wheel 23 slides underneath and against the lower edge of lever 25, until it comes rest in disk or wheel 24, thus facilitating the raising of connecting rod 19, and disk or wheel 23 comes to fit into the curved end of lever 25, thus the connecting rod is held in a stable closing position of the bucket in which the bucket can receive the product which is unloaded onto it at the proper time and this closing position is maintained due to the combined action of lever 25, spring 28 and disk or wheel 23 supported against disk or wheel 24.

Stop 30 is fastened to chassis 1. Each of the electromagnets corresponding to buckets 6, for the activation of corresponding blade 27 and to cause the opening of the bucket (for the unloading of the product it contains), is mounted on support 31 joined to central support 7 and located underneath it (FIG. 3, in which the electromagnets are not represented).

Obviously there will be as many electromagnets as there are buckets and these electromagnets will be located under fins 27 to activate the two walls of each bucket toward its opening position, according to what has been explained.

In order to direct the unloading of the batch of units of the product contained in the buckets selected—from the series of buckets—by the programming processing unit, in order to obtain the desired total weight of the product in question, the weighing machine exhibits, underneath the series of buckets 6, a collecting hopper 12 (FIGS. 1, 2 and 3), which collects the given batch of units of the product and conveys it by the means of transport toward the exit of the machine, that will carry these units of product toward the next machine in the facility, through other complementary transporting means as the case may be. In this example, the means for transporting the batch of units of the product which are being successively unloaded from the buckets selected by the programming processing unit and by collecting hopper 32, consist of endless belt 33 located between two lateral walls 34 which determine a suitable channeling for the exit of the product. The direction of the movement of the upper part of the endless belt may be toward the right or toward the left (according to FIG. 3), according to the arrangement of the facility in which the weighing machine is mounted, i.e. depending on which of the two sides the batches of units of products must be directed to, with the desired total weight and preset by the user of the weighing machine; the regulation of the total weight may be done by the user, along with the tolerance he desires, by activating the corresponding controls for adjustments such as those exhibited by the programming processing unit located in housing 2, in which the means for monitoring and adjusting can also be located, for the electric motor or the like for endless feeding belt 4 as the case may be at the entrance of the machine, for electric motor 10 and electric motor 35 which, by means of a corresponding transmission or any other conventional means, a reducer as the case may be, activates endless belt 33 of the means for conveying the product toward the exit of the machine. Obviously electric motor 35 may be replaced by any other conventional type of motor.

It also should be pointed out that the above mentioned means of conveying the products toward the exit of the machine could be comprised of a simple inclined ramp to facilitate the exit of the above mentioned batches to the outside of the machine, and any other known means may be used to effect the conveyance or simple movement of the repeated batches of product toward the outside of the machine, to feed in turn another machine as the case may be, such as canning machines; and, in any case, the weighing machine in question may be related to the canning machine or with other machines that it must feed, for example, by means of an electric signal or any other conventional means, in order to adjust the operating and down time of both machines, and thus to obtain a suitable coupling, maximizing their joint yield.

It is also possible and sometimes suitable for the weighing machine to exhibit certain means when the product enters, suitably in, or in the proximity of, mouth 5 and at its level or between it and the plane of the mouth of the buckets, in order to brake and/or cushion the movement and/or fall of product into the corresponding bucket (which is located underneath said mouth to receive the corresponding product), obliging said product to be unloaded correctly and to enter into this bucket; and these means may consist of brushes or curtains that are already known and have been used for years in this type of facility. Thus, the machine may exhibit means like those described in the exit area of the batches with the desired total weight, in order to regularize and homogenize their exit from the machine.

Weighing station 13 exhibits a horizontal track of a certain length, sufficient for the full bucket to be weighed to have time to be stabilized, i.e. to remain static and thus to obtain a weight that is as exact as possible, with the elimination of possible oscillations and vibrations due both to the unloading itself of the product onto the bucket, in the manner described, and to its movement, although the specific mounting of each bucket by a pair of elastic bands 12 also contributes in a positive manner to this stabilization.

It seems suitable, also because of its economy as to the means for activating to be used and the actual program to be executed by the machine, that the speed of rotation of central support 7 be constant, although it might also be appropriate for the speed to be able to be regulated (variable and even intermittent speed) manually or monitored by the programming processing unit, which also monitors the functioning of endless belt 4 or, in any case, of the conveyance feeding means at the entrance of the machine, to adapt this feeding to the needs of the machine, in combination with the machine which in turn supplies the batch of units of products with the preset total weight and tolerance.

The control for the opening of the walls of buckets 6 is executed, according to what has already been described, by the programming processing unit which decides, in accord with the strategy it is to follow and with the information that it receives on a permanent basis as to the weight of the buckets filled with product and its tare, together with their position at each moment as will be described further on, which of all the buckets should unload the product they contain, by the means of activation of the movable walls of said buckets, in order to unload the batch of product having the total weight with the tolerance preset by the user.

The buckets that contain units of product and that have not been selected since they cannot be combined with those chosen, when they circulate and move underneath unloading mouth 5 of the means for feeding of the machine (actually unloaded by endless belt 4 in this example), do not receive product, since the programming processing unit determines the stopping of these means for feeding and these buckets move past weighing station 13 and are again considered by the programming processing unit for their possible integration into the following batch of product to be obtained, without any unloading of the rejected product, as occurs in other weighing machines that are already known; thus the above mentioned product contained in the buckets not selected is treated more gently than in known machines.

The transmission of data originating from the means and devices mounted on revolving supports 7 and 31 to the programming processing unit can be verified through conventional means, such as brush contacts, infrared rays, optic fibers or any other suitable means; and the electric connection for the means for weighing 14 (load cells or transducers, etc.) can be accomplished by suitable means, such as electric conductors or others and even by electric induction, i.e. without wires, which allows for greater reliability in this transmission and connection and greater safety in them, particularly if it is borne in mind that the transmission of such data and/or signals has to be done through members and elements with relative rotation among themselves.

So that the programming processing unit can know the situation of the buckets at each moment, there can be, as in the example represented in FIG. 3, detecting means 36 which, in this case, are two in number and at different heights. In this way the upper detector receives a signal for each turn of the support with the series of buckets, through a guidepost or vertical rod that reaches its height and that passes very close to said higher detector; this guidepost is mounted on one of the internal fasteners of the pair of bands of one of the buckets in the series which will be determined by the guidepost or origin reference and the setting to zero (in the programming processing unit) for each turn of said series of buckets, while the lower detector receives the signal from each of the remaining buckets when they pass in front of it, for this purpose on each inner support of the pair of bands 12 of each bucket exhibits another shorter guidepost or vertical rod that has a height essentially equal to that of the lower detector and passes close to it.

The stabilization of the bucket that has just received the product from unloading mouth 5 is favored by the time that elapses from said loading area to the weighing station, thus by the eventual and appropriate support of the buckets, by their wheel 22 on a track fixed on frame 1 (not represented) and that is interrupted at least in weighing station 13 and stop 30.

In the drawings, the conduits for electricity and those for any other fluid used in the weighing machine have not been represented; these conduits connect the various activating devices of the machine among themselves; nor have the accessories for the monitoring and regulating of these devices by the programming processing unit been represented, including the weighing machine, conventional means of control, monitoring and safety, as well as other specific functions that may be desired.

The weighing machine equipped with the improvements described may exhibit protective covers or casings for the sake of the user and for its finishing, these covers may be totally or partially removable in order to gain access to the internal members of the machine.

The functioning of the automatic weighing machine for food products equipped with the improvements according to the invention takes place in practice according to what has been described up to now and illustrated in the drawings and can be summed up in the following manner:

The product placed in hopper 3 is conveyed, according to arrow G (FIG. 2), by endless belt 4 and the units of the above mentioned product being conveyed are continuously unloaded by end or mouth 5 of said endless belt, falling onto a corresponding bucket 6 which, at each moment, passes underneath said mouth, while central support 7 revolves with said buckets according to arrow F (FIG. 2); and the means for feeding the units of product to the entrance of the machine are regulated by the programming processing unit. Each bucket 6, which receives the corresponding units of product in the manner indicated, continues to move according to revolving movement already described, until its wheel 22 is supported on weighing station 13, on which it undergoes a slight raising and on which it continues to move, and its total weight is obtained (i.e. of the bucket and the product contained in the bucket) by weighing means 14, and when there is a determined number of filled buckets already weighed and located between weighing station 13 and stop 30, the programming processing unit orders the unloading of those full buckets that have been selected in order to obtain, with the combination of the weights of the units of product contained in them, each batch of units of the product with a total weight equal to that desired for each batch and also according to a preset tolerance; for this purpose the opening of the walls of the above mentioned selected buckets takes place by the corresponding activation of the electromagnets of said buckets, and this causes, in the manner explained earlier, this opening and the consequent simultaneous unloading of the totality of units of product contained in the various buckets selected, and their contents of units of the product is unloaded, by collecting hopper 32, onto endless belt 33, which conveys the above mentioned batch of units of the product toward the exit of the machine.

The buckets filled with product and that have not been unloaded, since they were not selected by the programming processing unit, will not receive more product from mouth 5 when they pass underneath it, thanks to the control that the programming processing unit exerts; while the buckets that have remained with their walls open, since they have been selected for unloading, will be closed when they pass over stop 30, which will continuously close them so that they can receive a new product when they subsequently pass underneath mouth 5.

This process is continuously repeated as many times as the above mentioned batches of units of product ar obtained with the desired total weight and tolerance for these batches.

It should be pointed out that when the weighing machine is placed into operation, the series of buckets makes a rotation motion sufficient so that all the empty buckets pass over the weighing station in order to obtain its weight or tare, that is recorded by the programming processing unit and each time that a bucket passes empty over this weighing station, its tare is again weighed, since the buckets may have remainders in them that could modify their tare.

I claim:

1. Improvements in automatic weighing machines for food products, comprising:

a support frame for receiving buckets of the machine;

means for activating said receiving buckets of the machine;

means for feeding a product into an entrance of the machine, controlled by a programming processing unit, which includes a hopper, a channel and at least one endless belt, whose end empties out into an area under which said receiving buckets move in a line and are open on the top to receive the product that is unloaded from said end of the endless belt;

means for weighing the product contained in each receiving bucket and its tare;

a programming processing unit which continually records the tare of each receiving bucket and the real weight of the product that is collected by each receiving bucket as they continually move by, and when a total weight of the product contained in certain receiving buckets reaches a value with a preset tolerance, the programming processing unit orders the unloading of those receiving buckets whose batch of units of product adds up to said total preset weight, and wherein there are means for connecting the programming processing unit to the receiving bucket of the machine;

wherein the receiving buckets, arranged in a circle and in an overhanging manner, are joined radially by suitable means to a central revolving support in relation to a central vertical axis; in that each receiving bucket is joined to the central support by two horizontal, parallel and superimposed elastic bands which allow for the vertical swinging of the bucket; in that the receiving buckets continually pass in succession over a station with a single means for weighing the receiving bucket, connected with the programming processing unit; and in that the receiving buckets include at least one movable wall, and this wall is activated by the programming processing unit for the selective unloading of each batch of units of the product contained in the receiving buckets selected according to the total weight desired; the loading takes place onto means for conveying each one of the batches of product toward the exit of the machine.

* * * * *